July 29, 1969  J. A. MERCURIO  3,457,917
NASAL FILTERING DEVICE
Filed Feb. 17, 1966
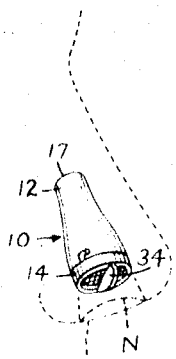
FIG.1.
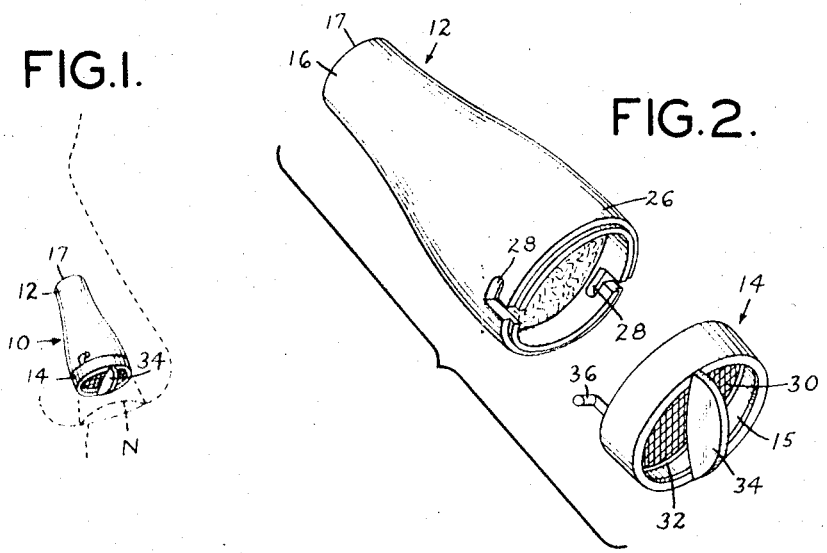
FIG.2.
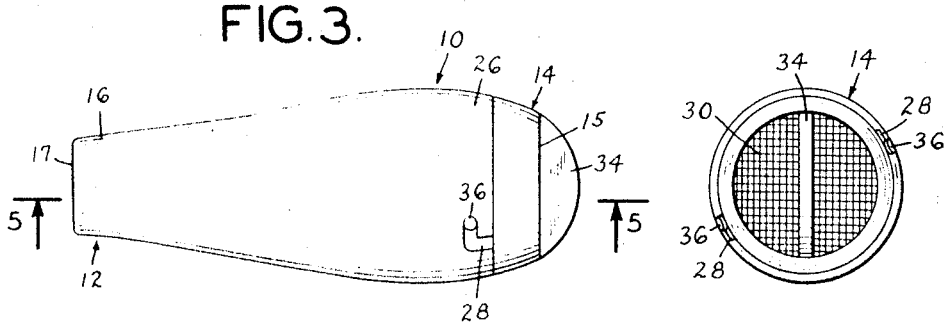
FIG.3.
FIG.4.
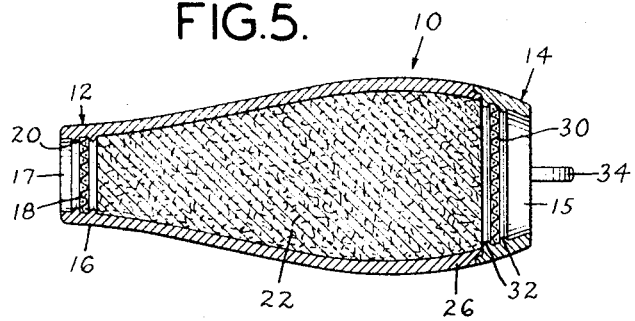
FIG.5.
INVENTOR
JOHN A MERCURIO
BY
Charles J. Speciale
ATTORNEY

United States Patent Office 3,457,917
Patented July 29, 1969

3,457,917
NASAL FILTERING DEVICE
John A. Mercurio, Kings Highway,
Valley Cottage, N.Y. 10989
Filed Feb. 17, 1966, Ser. No. 528,299
Int. Cl. A61f *1/18;* A61m *15/06*
U.S. Cl. 128—140         1 Claim

ABSTRACT OF THE DISCLOSURE

A nasal filtering device shaped substantially to conform to the contour of a nasal passage comprising a filter retaining member, filtering material, a cap detachably engageable with said filter retaining member, means for retaining said filtering material in said filter retaining member, and finger gripping means provided on said cap.

---

This invention relates to a new and useful filtering device for insertion in the nostrils, whose purpose is to prevent foreign matter, which may be present in the surrounding environment, from entering the nasal passage of the wearer. More particularly, this invention relates to a new and useful nasal filtering device which is easily inserted into the nostrils, which is readily removable from same, and in which the filtering element can be quickly and expeditiously replaced.

Nasal filters for use by hay fever suffers or asthmatics and for those who must work in polluted atmospheres, such as construction workers, house wreckers and the like have heretofore been proposed. However, these have been commercially unsuccessful, being cumbersome and uncomfortable to the wearer. It was another outstanding and annoying disadvantage of these prior art filters that once they were inserted into the nasal passages the wearer could not get them out any more. Various things were suggested such as for example a pick-like device to pull the filter out, a bridge-like connection between the two inserts which hung below the nasal passages, and one even left the wearer on his own by constructing a nasal filtering device which required a long fingernail for removal. As can be surmised, these nasal devices were either dangerous to remove, ugly and unsightly, or almost impossible to take out. Similarly, certain of the prior art nasal filters were unsuccessful because the filtering elements were difficult, if not impossible, to replace requiring constant re-purchase of the entire assembly.

It is, therefore, an object of this invention to provide a light, comfortable and efficient nasal filtering device, for the purpose of preventing foreign matter such as dust, lint, pollen and other impurities of the like from entering the nasal passages of the wearer, which is easily insertable and readily removable from the nostrils.

It is still another object to provide a nasal filter in which the filtering element may be quickly and easily replaced.

These and other objects will flow from and become apparent from the structures and combination of parts hereinafter more fully described with reference to the accompanying drawing in which:

FIG. 1 is a view of the nasal filtering device, constructed according to the teaching of this invention, inserted into one of the nasal passages.

FIG. 2 is an exploded perspective view of the nasal filtering device showing the removable cap detached from the filter retaining member.

FIG. 3 is a side view of the device.

FIG. 4 is a bottom plan view of the removable cap and looking in the direction of the outermost portion of the device as inserted into the nostril in FIG. 1.

FIG. 5 is a cross-sectional view of FIG. 3 taken along lines 5—5.

Referring now to the figures of the drawing, the nasal filtering device, shaped substantially to conform to the contour of the nasal passage, shown thereby is generally identified by the numeral 10, and comprises a filter retaining member 12 and a removable cap 14.

For purposes of illustration, FIG. 1 depicts a human nose wherein the nasal passage N is clearly designated. The body of the nasal filtering device 10 has an air passageway 17 defined therein that extends completely therethrough from the narrower extremity 16 of the filter retaining member 12 to its wider extremity 26. Interposed in the air passageway 17 is a filtering material 22, which may be of any well-known composition such as, for example, but not by way of limitation, fibreglass, cellulose material, or granular charcoal. The filtering material 22 may be impregnated, if desired, with a medicament such as menthol, camphor, or any of the other commercially available breathing acids, for use by cold and hay fever sufferers, or of like respiratory nature. The filtering material 22, is retained by a porous filter means 18, in narrower extremity 16 of member 12, inserted into retaining means 20, and likewise by a porous filter means 30, in removable cap 14, inserted into retaining means 32. The porous filter means 18 and 30 may be of a well-known construction, such as, for example, but not by way of limitation, a simple mesh gauze having a plurality of closely packed small pores, or likewise, a closely meshed screen of copper or aluminum.

The removable cap 14, having the dual function of providing ease of removal of the device 10 from nasal passage N and ease of replacement of filtering material 22, comprises a porous filter means 30, as mentioned, inserted into retaining means 32, a finger gripping tab 34, integrally joined to the rim of outer end 15 of removable cap 14, and male portions 36 of the bayonet gripping means of cap 14 adapted to detachably engage into bayonet slots 28 of wider extremity 26 of retaining member 12. The finger gripping tab 34 extends sufficiently outwardly from outer end 15 in convex fashion, so as to provide ready removal by the fingers from the nasal passage N of the device 10, but not enough thereby to be visible on the outside of the wearer's nose.

The nasal filtering device according to the invention may be formed from a suitable easily molded plastic such as, for example, polytetrafluoroethylene or Bakelite. It may also be formed from a hard rubber or similar material.

While there have been shown and described and indicated the fundamental novel features of this invention as applied to a preferred embodiment thereof, it is to be undertood that various omissions, substitutions and changes in the form and details of the device illustrated and in its operation may be made by those skilled in the art, without departing from the spirit of the invention.

I claim:

1. A nasal filtering device shaped substantially to conform to the contour of a nasal passage comprising a filter retaining member, filtering material, and a cap detachably engageable with said filter retaining member, said cap being provided with gripping means having male portions, said filter retaining member being narrower at one extremity than the other, said filter retaining member containing an air passageway therethrough, said filter retaining member also having porous filter means for retaining said filtering material, at its narrower extremity, and locking means at its wider extremity, for engaging said male portions of the gripping means of said cap, said cap likewise having porous filter means for retaining said filtering material and said cap having also a finger gripping means integrally joined to the rim of the outer end of said cap, said filtering material being interposed in said air passageway in said filter retaining member and wherein said porous filter means is a mesh having a plurality of closely packed small pores, said locking means are bayonet slots diametrically opposed in said wider extremity, said male portions of said gripping means are bayonet-type male portions diametrically opposed in said cap and in relation to said bayonet slots, so as to be detachably engageable with same, and said finger gripping means is a tab extending in convex fashion from said rim.

References Cited

UNITED STATES PATENTS

| | | | |
|---|---|---|---|
| 611,478 | 9/1898 | Hannon et al. | 128—198 |
| 2,251,139 | 7/1941 | Koehler | 128—140 |

FOREIGN PATENTS 23,729     1903    Great Britain.

WILLIAM E. KAMM, Primary Examiner

U.S. Cl. X.R.

128—206